(12) United States Patent
Hoess et al.

(10) Patent No.: US 6,527,096 B2
(45) Date of Patent: Mar. 4, 2003

(54) CONTROL DEVICE FOR THE PARKING LOCK OF A MOTOR VEHICLE

(75) Inventors: Bruno Hoess, Ottersweier (DE); Helmut Schäfer, Ketsch (DE); Nicolai Tarasinski, Frankenthal (DE); Peter Falck, Waterloo, IA (US); Timothy Kilworth, Waverly, IA (US); Uwe Kugler, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/982,680

(22) Filed: Oct. 19, 2001

(65) Prior Publication Data

US 2002/0088684 A1 Jul. 11, 2002

(51) Int. Cl.[7] .......................... B60K 41/26; F16H 57/10
(52) U.S. Cl. .......................... 192/219.5; 188/3 H; 303/3
(58) Field of Search ...................... 192/219.5, 219, 192/219.6; 188/3 H, 151 R, 82.7; 303/3, 15

(56) References Cited

U.S. PATENT DOCUMENTS

| | | | | |
|---|---|---|---|---|
| 3,610,004 A | * | 10/1971 | Neese | 70/218 |
| 3,999,075 A | * | 12/1976 | Johnson et al. | 303/63 |
| 4,339,154 A | * | 7/1982 | Duttarer et al. | 303/3 |
| 4,989,703 A | * | 2/1991 | Forsyth et al. | 192/221 |
| 5,203,616 A | * | 4/1993 | Johnson | 303/15 |
| 5,675,190 A | * | 10/1997 | Morita | 303/3 |
| 5,984,425 A | * | 11/1999 | Orzal | 303/3 |

FOREIGN PATENT DOCUMENTS

| | | |
|---|---|---|
| DE | 41 27 991 | 8/1991 |
| DE | 197 51 431 | 11/1997 |
| DE | 198 34 156 | 7/1998 |
| WO | WO 98/04430 | 2/1998 |

* cited by examiner

Primary Examiner—Rodney H. Bonck

(57) ABSTRACT

A control device for the parking lock of a motor vehicle has at least one actuating drive (46) that can be operated by triggering devices and with which a locking device (11) can be moved between engaged and disengaged positions. For reliable operation, at least two independent triggering devices are provided and a change in position takes place only if both triggering devices (56, 58) are actuated. Preferably a hydraulic piston (46) brings the parking lock into its disengaged position when subjected to pressure. The triggering devices are constructed as solenoids (56, 58) under the control of two electrical controllers (140, 142) that undertake an evaluation of relevant control and measurement parameters.

25 Claims, 1 Drawing Sheet

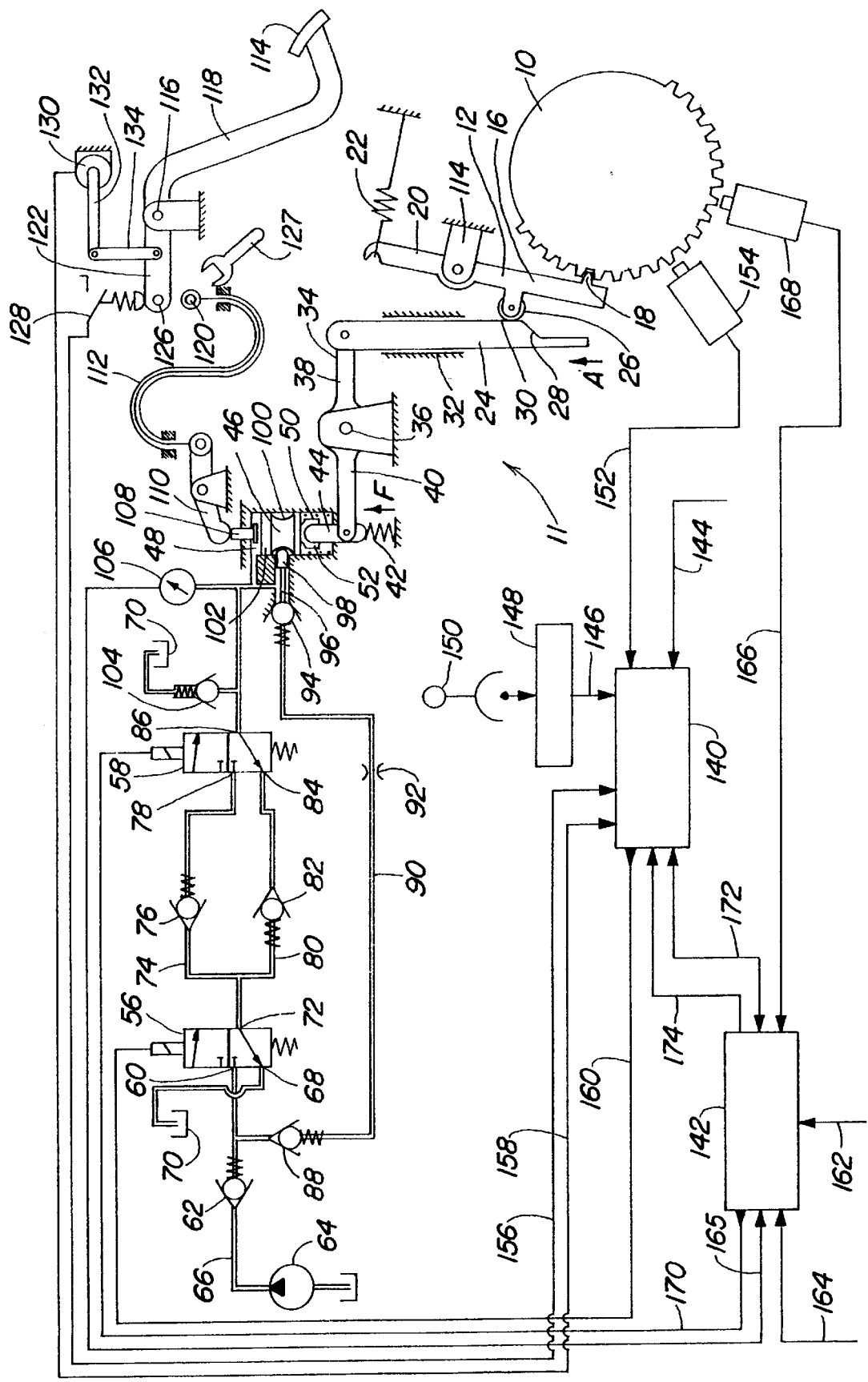

CONTROL DEVICE FOR THE PARKING LOCK OF A MOTOR VEHICLE

BACKGROUND OF THE INVENTION

The invention pertains to a control device for the parking lock of a motor vehicle with at least one actuating drive element that can be operated by triggering means, with which at least one locking device of the parking lock can be brought from an engaged position, into which it is pressed by a retaining force, into a disengaged position.

For current vehicle transmissions (synchronized, power-shifting or automatic transmissions), the parking lock is usually set manually via a mechanical linkage in order to block the rotational motion of gear or vehicle wheels with a positive lock. As part of increasing driver comfort, transmissions have been designed with an electrically operated shifting of gears, so that the gear-shift command from the driver is done by pushing a button. It would make sense for the parking lock also to be incorporated into this servo operation. When infinitely variable transmissions, which can implement a non-positively locked stop by setting an infinitely high transmission rate, are used, the actuation of the parking lock ought to be automated so that the transition from the non-positive stop to the park position (and vice versa) takes place without interruption of the braking force of the vehicle. It is therefore sought to design the actuation of the parking lock (a mechanical, positive locking of an output-side gearwheel) such that setting and releasing the lock takes place by transmission of an electric command.

Since the operating safety of the vehicle depends quite crucially on the functioning of the parking lock, its design and layout should be operationally secure, that is, redundant. This pertains above all else to the reliable execution of the driver's desire for locking and unlocking, the prevention of unintended locking during travel and of unintentional unlocking while stopped (due, for instance, to failure of auxiliary power, a short circuit in the power circuit and the like).

The problem underlying the invention is viewed to be the specification of a control device for the parking lock of the initially mentioned type, by which means the aforementioned requirements are met. In particular, the control device should permit safe, reliable actuation of the parking lock. It should be possible for it to be manufactured in a simple, economical manner and constructed such that it can be retrofitted into existing transmissions without significant difficulties.

SUMMARY OF THE INVENTION

According to the invention, at least two triggering means acting independently on the actuating drive element are provided, which interact with the actuating drive element such that movement of the locking device out of the engaged position into the disengaged position or, conversely, from the disengaged position into the engaged position takes place only if the two triggering means are triggered with changeover signals in the same sense.

This can be implemented in various ways. For instance, the actuating drive element can be a magnetic solenoid plunger which engages the locking device when it is de-energized and disengages it when it passes current. The triggering means can be electrical switches situated in the power circuit of the solenoid plunger and actuated by an electrical controller via electrical switching signals.

A preferred embodiment of the invention provides an electro-hydraulically operated controller. The drive element here is preferably a hydraulic actuating piston under initial spring tension, which brings the parking lock into its disengaged position upon application of pressure. The triggering means are expediently constructed as electrically triggerable hydraulic valves, which can be brought against the force of a spring by electrical signals from an idle position into an active position. 3/2-way solenoids come into particular consideration.

In this case, the hydraulic valves convert electrical commands into hydraulic commands. In particular, they are connected, in conjunction with the check valves, such that a change of state for the parking lock (unlocking or locking) takes place only if both hydraulic valves switch in the same sense. If both hydraulic valves are in the de-energized state, then the actuating drive element, specifically, the actuating piston, is connected to the non-pressurized sump and inflow from the pressure source to the sump is cut off, so that the actuating drive element, and with it the parking lock, is in the engaged, locked position. If power is applied to both hydraulic valves, their magnetic slides are pushed against the force of their respective restoring springs into the position in which the actuating drive element is connected to the pressure source and separated from the sump. Under the force of the system pressure from the pressure source, the actuating drive element moves into its disengaged, unlocked position against the force of the parking lock spring providing retaining force.

The check valves mentioned in claims 5 and 6 are connected in opposite directions and are preferably held in their closed positions by restoring springs. With a sufficiently high hydraulic pressure, the check valves can be opened against the spring force.

Independently of the state (engaged or disengaged) in which the parking lock is situated, this state is preserved if only one hydraulic valve is changed over. Such a changeover can be initiated, for instance, by an unintentional electrical signal (e.g., by an electrical short circuit to ground or to a 12-V power source).

It is expedient for a spring-loaded input check valve, which blocks flow back to the pressure source in case of loss of system pressure that may unexpectedly occur during travel and can thus preserve pressure on the actuating drive element, to be placed in the inlet path of pressure flow to the hydraulic valves. In this way, a sudden engagement of the parking lock during travel due to loss of pressure in the system (pump damage, leakage in the system, etc.) is prevented. The design can be such that the pressure in the actuating drive element can be maintained for approximately 10 min, so that time remains for the vehicle user to bring the vehicle to a controlled stop after the appearance of a warning message.

The two hydraulic valves are preferably implemented as economical slide valves, which normally exhibit a certain leakage, depending on the temperature of the hydraulic fluid and the pressure differential. If, for instance, the first hydraulic valve should lose power and switch back due to a cable breakage or the like during travel, i.e., with a disengaged parking lock, it is possible for the piston chamber of the actuating piston to be slowly emptied back into the sump via internal leakage of the second hydraulic valve. Specifically to prevent this, a preferred refinement of the invention provides that the piston chamber of the actuating piston be connected to the pressure source via an additional valve arrangement.

A pressure-maintaining check valve, which prevents a backflow from the piston chamber to the pressure source, and a throttle point are expediently arranged in series in a connection line linking the piston chamber to the pressure source. Thus, the piston chamber of the actuating piston can also be supplied directly from the pressure source via the pressure-maintaining check valve and the throttle point when the parking lock is completely released—that is, when the piston chamber is under pressure, the actuating piston is moved into the disengaged position and the leakage compensation valve is opened—so that pressure is maintained even in case of leaks. In case of a pressure drop during travel, the pressure-maintaining check valve prevents the piston chamber from being emptied by a backflow via the connection line to the sump (due to leakage of the first hydraulic valve). For the case where the actuating piston is to be brought into its engaged position by the hydraulic valves connecting the piston chamber to the sump, the throttle point limits the inflow to the piston chamber and thus permits a sufficient fluid drainage via the hydraulic valves, so that the actuating piston can assume its engaged position and remain in this position.

It is of particular advantage to arrange a controllable leakage-compensation valve in the connection line linking the piston chamber to the pressure source, through which valve a fluid flow from the pressure source to the piston chamber can be controlled. The leakage-compensation valve is preferably a check valve pressed by a restoring spring into the closed position. It is expedient to couple the leakage-compensation valve via a mechanical connecting member to the actuating piston so that it is always open whenever the actuating piston assumes its disengaged position. If the actuating piston is in the non-pressurized engaged position, then the leakage-compensation valve is not opened by the mechanical connecting member, but is instead closed due to system pressure or spring-loading. An unintentional disengagement of the parking lock by direct fluid supply from the pressure source is thus out of the question in this piston position.

It is particularly advantageous to connect the piston chamber of the actuating piston to the sump via a drain valve, which is opened without pressure by spring force. When the parking lock is set, that is, when the actuating piston is not pressurized, a certain amount of leakage fluid can be removed via this drain valve. This is of particular importance if the regular connection between the actuating piston and the sump via the hydraulic valves is closed off due to faulty power supply to the first hydraulic valve (e.g., short circuit to 12 V). Then, due to this amount of leakage fluid, an accumulated pressure could build up in the piston chamber of the hydraulic cylinder which could lead to an undesired disengagement of the parking lock in this fault situation. In the regular disengagement of the parking lock, the drain valve is immediately closed by the flow force of the fluid stream released through the hydraulic valves. The opening pressure of the drain valve is expediently chosen to be higher than the opening pressure of the check valve in the second connection line so that, after shutting of the two hydraulic valves, when the pressure in the piston chamber therefore drops, the drain valve is actually opened and not kept closed by the slight residual pressure (e.g., 0.2 bar) in the pressure chamber corresponding to the spring force of the aforesaid check valve.

The locking device preferably features a detent pawl seated in the transmission housing which can be brought into engagement with a gearwheel firmly connected to the vehicle axle. The detent pawl is connected to the actuation drive element via mechanical connecting element. The tooth geometry is preferably designed to be repellent so that, even under maximum loads, the detent pawl goes securely out of engagement when the actuation is terminated.

For the case where the vehicle must be towed in case of a failure of the on-board electrical or hydraulic systems, the parking lock must be released. To this end, a preferred refinement of the invention provides for the arrangement, parallel to the above-described components of the control device, in particular, the electro-hydraulic actuation, of a mechanical emergency actuation device for disengaging and re-engaging the parking lock. When the mechanical emergency actuation device is operated, the locking device of the parking lock is disengaged against the retaining force of a parking lock spring and fixed in this position.

It is of particular advantage here to link the locking device optionally to a clutch pedal such that, by operating the clutch pedal, the locking device assumes its disengaged position. The linkage can be accomplished by detachable connecting elements.

Furthermore, the mechanical emergency actuation device is constructed such that the normal movements of the mechanical park lock actuation do not cause any movement of the mechanical emergency actuation device. This can be assured by the appropriate lost motion or freewheel functions.

According to a preferred embodiment of the invention, at least one electrical controller is provided which issues electrical control signals to the hydraulic valves for engaging (no current flow) and disengaging (current flow) the parking lock. This expediently involves a transmission controller that executes the functions of the invention. The command for engaging and disengaging preferably is initiated directly by the vehicle user or comes from a transducer of the operating lever or from another measurement transducer, for instance, an rpm sensor or a measurement transducer of particularly safety-relevant measured parameters, which are evaluated by the controller.

It is also advantageous to provide a transducer, in particular, a pressure sensor, which directly or indirectly detects the position of the locking device and communicates it to the controller, so that an acknowledgment of the actual parking lock position is available at all times.

An advantageous configuration of the invention provides a main, or transmission, controller and a backup, or parking lock, controller, which are independently supplied with power and communicate with one another. The command for engaging or disengaging the parking lock is, on the one hand, sent directly from the main controller to the first hydraulic valve and, on the other, via the backup controller to the second hydraulic valve. Preferably, both controllers independently receive rpm signals from the vehicle's drive unit.

This arrangement offers redundancy. With it, it is possible to prevent a defective controller or a defective sensor from causing an unintended setting of the parking lock above a preset travel velocity or an unintended disengagement at rest with the motor running (supply pressure!). The direct power supply to the backup controller (separate connection to the vehicle battery) assures that turning off the ignition during travel does not cause automatic setting of the parking lock. A wake-up signal can also be generated by a line from the ignition lock to the backup controller. The two controllers are connected together via communications lines which serve for mutual monitoring.

Preferably, at least one sensor or switching element for detecting the position of an emergency actuation device, such as a clutch pedal is provided, the signals of which are detected and evaluated by the controller.

The design of the invention uses existing components of the parking lock contained in the transmission (gear, pawl, camshaft) and can be added on from the outside as an electro-hydraulic actuation element, so that automated operation of an existing transmission can be retrofitted. The capability for operation via auxiliary power is a considerable improvement of comfort and also makes it possible to integrate the parking lock functions into modern operating elements (joystick, armrest controls, and so on). The design is safe in operation in case of failure of the auxiliary hydraulic power and in case of various interruptions/short circuits and in case of faulty operation (setting the parking lock or turning off the ignition during travel). Even if there is a faulty power supply to one of the two hydraulic valves, the selected operational state (in this case, park) is safely preserved. The hydraulic circuit is constructed of simple, commercially available and reliable components.

Because of the electronic control of parking lock actuation, additional functions can be implemented, in addition to the execution of the driver's instructions:

automatic setting of the parking lock at rest if the engine is turned off or, in the case of infinitely variable transmissions, if the state "non-positively locked stoppage" exceeds a certain length of time;

prevention of setting the parking lock at speeds above a predetermined value (e.g., 1 km/h), even if the driver calls for this;

automatic setting of the parking lock when the vehicle comes to a stop, in case of transmission defects;

continuous plausibility querying and issuance of error messages.

The invention, as well as additional advantages and advantageous refinements and configurations of the invention, will be described and explained in greater detail on the basis of the drawing, which shows an embodiment of the invention. In the sole figure, the functional plan of a control device according to the invention with hydraulic and electrical control loops is schematically illustrated.

DETAILED DESCRIPTION OF THE PREFERRED EMBODIMENT

The control device as illustrated can find application with a parking lock of an agricultural tractor. An output gear 10 of the vehicle transmission, tightly connected to the driven axles and wheels (not shown) of the agricultural tractor, is illustrated.

A mechanical locking device 11 is provided, containing a detent pawl 12 constructed in the shape of a rocker, which is seated by means of a mount 14 free to pivot on the transmission housing or vehicle chassis, neither of which is shown. A first arm 16 of detent pawl 12 bears a tooth 18. By pivoting detent pawl 12, tooth 18 of detent pawl 12 can be brought into engagement with the teeth of output gear 10 so that a positive lock is formed and rotation of gear 10, and thus movement of the vehicle, is prevented. The tooth geometry is designed to be repellent, so that even under maximal loads (vehicle weight, slope inclination, coefficient of traction, and so on), detent pawl 12 can be safely detached from engagement with output gear 10. A restoring spring 22 acts on the other arm 20 of detent pawl 12, effecting a safe retraction of detent pawl 12 into its idle position in which its tooth 18 is not engaged with the teeth of output gear 10, so long as no additional mechanical force is exerted on detent pawl 12.

Locking device 11 can additionally contain a spring-loaded actuating shaft, the end face of which features actuating cams. During rotation of the actuating shaft, the actuating cam comes into engagement via a friction-reducing roller with a detent pawl 12 and effects a pivoting of detent pawl 12. Such a construction is known and used, for instance, in the John Deere tractors of the 6610 series. For the sake of improved comprehension, a movable bar 24 is shown in the drawing in place of the actuating shaft. On one side, bar 24 has an inclined ramp (cam) which effects a pivoting of detent pawl 12 via a friction-reducing roller 26 placed on first arm 16 of detent pawl 12. The ramp comprises an area 28 with a steeper angle, which lies in the pivot range of detent pawl 12, and an area 30 with a shallow angle, which lies in the engagement area (park position) of detent pawl 12 and minimizes the reaction of high vehicle-side loads on the actuation. By displacing bar 24 in the direction of arrow A, detent pawl 12 is moved into its disengaged position, and by pushing it back against the direction of arrow A, it is moved into its engaged position, in which area 30 with a shallower angle is engaged with roller 26 (as illustrated).

The bar 24 run in guide 32 is articulated to a first arm 34 of a beam 38 that can be swung about a stationary axis of rotation 36. Acting on second arm 40 of beam 38 is a main spring 42 which exerts a force in the direction of arrow F and presses bar 24 against the direction of arrow A into the illustrated engaged position. In contrast to previous manual actuations, locking device 11 assumes its locked (engaged) position as the default position in the absence of any additional impingement of force. This guarantees a safe vehicle state in case of failure of auxiliary power.

Also acting on arm 40 of beam 38 is the actuating shaft 44 of a hydraulic actuation piston 46. Piston 46 is housed to move freely in a borehole of the transmission housing, and delimits a piston chamber 48 with its end face facing away from actuating shaft 44. A compression spring 50 presses piston 46 in the direction of piston chamber 48. Actuating shaft 44 is not rigidly fastened to piston 46. Instead, a sliding connection 52 is provided between the two components, which permits transmission of a compressive force but not of a tensile force.

If piston chamber 48 is placed under pressure, then piston 46 moves downward against the force of compression spring 50 and presses via actuating shaft 44 on beam 38, which is pivoted against the force of main spring 42 and moves bar 24 upward. Thus, roller 26 goes from area 30 with a shallow angle into area 28 with a steeper angle and releases detent pawl 12, which is pivoted by the force of restoring spring 22 into its disengaged position.

If the pressure force in piston chamber 48 is cut off due to an engagement signal, then piston 46 reacts immediately. It is pushed upward by compression spring 50 and presses the fluid volume out of piston chamber 48. Because of the sliding connection 52 between piston 46 and actuating shaft 44, piston 46 moves independently of whether the mechanical components of locking device 11 follow the displacement of the piston.

The construction of the sliding connection 52 has a particularly advantageous effect if the tooth 18 of the detent pawl is on top of the tooth of output gear 10 (tooth on tooth) at the time of an engagement signal, so that meshing of the teeth is initially not possible. The components of locking device 11, particularly beam 38 and actuating shaft 44, then cannot assume their engaged position. Independently of this, however, piston 46 is pressed upward by the force of compression spring 50 and empties piston chamber 48, which may require a short span of time due to flow resistances of the hydraulic components controlling piston chamber 48 (depending on the oil viscosity). If an engagement of teeth then takes place by rotation of output gear 10, the components of locking device 11 can instantly follow this, without impeding the engagement motion by hydraulic flow resistances and the like. Rapid engagement of teeth is desirable to prevent output gear 10 from reaching a high rotational speed in case of strong acceleration, so that an engagement of teeth is made more difficult by the relative motion of the teeth, or is no longer possible at all.

The control of the hydraulic medium flow to and from piston chamber 48 is accomplished by two 3/2-way solenoids 56, 58, which convert electrical commands into hydraulic commands. First input 60 of first solenoid 56 is connected with the interposition of a spring-loaded input check valve 62 to a pressure supply line 66 fed by a pressure source 64. Input check valve 62 prevents backflow of hydraulic medium from first solenoid 56 to pressure supply line 66. It opens when the pressure in pressure supply line exceeds an opposing forced generated by a spring of input check valve 62. Pressure source 64 is, for instance, a hydraulic pump and the usual means for regulating pressure, which also supply other loads of the tractor, which is not shown, however.

A second input 68 of first solenoid 56 is directly connected to a hydraulic fluid sump 70. With a voltage applied, output 72 of first solenoid 56 is connected to first input 60 and without power applied, to second input 68 (as shown).

Output 72 of first solenoid 56 is connected via a first connection line 74, in which a first check valve 76 is arranged, to a first input 78 of second solenoid 58 and, via a second connection line 80, in which a second check valve 82 is arranged, to a second input 84 of second solenoid 58. First check valve 76 is spring-loaded and arranged such that it prevents a backflow from second solenoid 58 to first solenoid 56. Second check valve 82 is spring-loaded and arranged such that it prevents an inflow from first solenoid 56 to second solenoid 58.

When there is a voltage at second solenoid 58, the output of the second solenoid is connected to first input 78, and in the deenergized state of second solenoid 58, it is connected to second input 84 (as illustrated). Output 86 of second solenoid 58 is connected to piston chamber 48.

Piston chamber 48 is also connected to pressure supply line 66 via an additional valve arrangement, specifically, via input check valve 62, a pressure-maintaining check valve 88, a connection line 90, in which a throttle point 92 limiting the amount of flow is arranged, and a leakage-compensation valve 94. Pressure-maintaining check valve 88 is spring-loaded and prevents backflow of fluid from piston chamber 48 to pressure supply line 66. Leakage-compensation valve 94 is a spring-loaded check valve that ordinarily prevents fluid flow into piston chamber 48 and can be opened by a connecting link influenced by piston 46. The connecting link contains a control pin 96, the head 98 of which is engaged in an annular groove 100 of piston 46 so long as piston 46 is in its non-pressurized idle position (as illustrated). In this position of control pin 96, leakage-compensation valve 94 is closed. When piston 46 moves downward in piston chamber 48 due to an elevation of pressure, control pin 96 is pressed out of annular groove 100 and slides onto shoulder 102 of piston 46 facing piston chamber 48. In the process, control pin 96 is displaced and opens leakage-compensation valve 94, creating a connection between pressure supply line 66 and piston chamber 48. The flow of pressure medium is limited by throttle point 92, however, and suffices only to compensate for leakage losses. If piston chamber 48 is connected to non-pressurized sump 70 via solenoids 56, 58, the pressure in piston chamber 48 drops, piston 46 moves upward, control pin 96 slides into annular groove 100, and leakage-compensation valve 94 closes by its spring force, so that piston chamber 48 is cut off from pressure supply line 66.

Piston chamber 48 is connected via a drain valve 104 to sump 70. If piston chamber 48 is non-pressurized, drain valve 104, constructed in the manner of a check valve, is opened by spring force. Via drain valve 104, a certain amount of leakage fluid can therefore be removed when the parking lock is engaged while piston chamber 48 is non-pressurized. If the two solenoids 56, 58 are turned on, and thus the connection from pressure supply 64 to piston chamber 48 is created, then drain valve 104 is closed by the flow force of the escaping fluid so that the pressure in piston chamber 48 rises and the parking lock is disengaged.

The pressure of piston chamber 48 is detected by a pressure sensor 106 and converted into electric signals. The pressure signal issued by pressure sensor 106 essentially reflects the respective position of piston 46 and thus also the position of locking device 11.

A manually operable mechanical emergency actuation system for the parking lock is provided, with which the parking lock can be disengaged when there is a malfunction, for instance, in the electrical or hydraulic power supply. An emergency actuation may, for instance, be necessary for towing away the vehicle. The emergency actuation device acts on piston 46 and is led by way of control rods or a Bowden cable into the cabin and can be operated there by way of suitable levers or pedals by the person operating the vehicle. This operation must be locked in the cabin for towing. The mechanical parking lock is designed so that the normal movements of the parking lock mechanism as described above do not cause any movement of the emergency actuation device. This is assured by appropriate lost motion or freewheel functions.

The emergency actuation device illustrated contains an actuating bar 108 which acts on the end face of piston 46 and can be operated by way of a deflecting lever 110 and a Bowden cable 112. The lead through of actuating bar 108 from piston chamber 48 to the outside is sealed in an appropriate manner. Stroke motions of piston 46 when engaging and disengaging the parking lock are not transferred to the actuating bar, shown in its idle position.

A vehicle clutch pedal 114, fastened to a pedal lever 118 mounted on a stationary rotational shaft 116, is illustrated. The clutch pedal 114 can be used for an emergency actuation of the parking lock by connecting upper end 120 of Bowden cable 112 to free end 122 of pedal lever 118. To accomplish this, a hole in Bowden cable 112, for instance, is suspended from a bolt 126 projecting from free end 122 of pedal lever 118 and secured if desired. A symbolically illustrated tool 127 can be used for the suspension and securing.

Upon actuation of clutch pedal 114, the suspended end 120 of Bowden cable 112 is pulled upward. In the process, deflection lever 110 pivots and presses actuating bar 108 downward, so that piston 46 pulls bar 24 upward via beam 40, so that roller 26 of detent pawl 12 moves into the area 28 with a steeper angle and detent pawl 12 is moved by restoring spring 22 out of its engaged position (shown) and into its disengaged position. When clutch pedal 114 is relieved of pressure, pedal lever 118 assumes its home position as shown, into which it is pushed by an ordinary clutch pedal restoring spring. Under the force of main spring 42, beam 38 pushes bar 24 downward, so that roller 26 moves into the area 30 with a shallow angle and presses detent pawl 12 into its engaged position.

As an alternative to the Bowden cable 112, a link can be coupled to the first arm 34 of the beam 38. The link can be provided with a slot to allow lost motion of the beam 38 during normal operation of the control device to engage and disengage the park lock without affecting the emergency actuation device.

In order that clutch pedal 114 need not be operated constantly during a towing process, it can be locked in the actuated position by suitable measures. This is accomplished, for instance, by a locking bolt, not shown, which immobilizes pedal lever 118 in relation to the vehicle chassis.

The position of pedal lever 118 is detected by an electrical position sensor 130, which is connected to the free end 122 of pedal lever 118 and issues an analog signal corresponding to the respective position of pedal lever 118. The sensor 130 may be a rotary potentiometer connected to rotating shaft 116. In the embodiment as illustrated, a rotary potentiometer 130 is shown, which is connected by a rotating arm 132 and a link 134 to free end 122 of pedal lever 118.

If clutch pedal 114 has not been operated and the free end 122 of pedal lever 118 is in its home position, position switch 128 is open. It closes as soon as clutch pedal 114 has been pushed all the way down. When clutch pedal 114 is used for emergency actuation of the parking lock, the output signal of position switch 128 (closed position) thus indicates whether the parking lock has been cancelled.

Particularly for vehicles with infinitely variable transmissions, the position of the clutch pedal is frequently monitored by a transmission controller by means of position sensors and position switches, in order to shift the transmission automatically into neutral as soon as clutch pedal 114 is operated. It is advantageous to use these already existing components for emergency actuation. The use of clutch pedal 118 for emergency actuation is also advantageous because large forces can be transmitted to locking device 11 by operation with the foot, so that the force of main spring 42 can be effortlessly overcome.

To trigger the two solenoids 56, 58, an electronic main or transmission controller 140 and a backup or parking lock controller 142 are provided. Main controller 140 is connected via line 144 to the ignition switch of the vehicle, not shown, as well as via line 146 to a vehicle controller 148, which in turn detects the position of an operating lever 150. Via line 152, main controller 140 receives signals from a first rpm sensor 154, which detects the speed of output gear 10, as well as receiving, via lines 156 and 158, signals from position switch 128 and rotary potentiometer 130 which detect the position of clutch pedal 114. Main controller 140 triggers first solenoid 56 via line 160.

Backup controller 142 is directly connected via line 162 to the battery, not shown. It is also connected via line 164 to the ignition switch, not shown. Via line 165, backup controller 142 receives signals from pressure sensor 106 as well as, via line 166, signals from a second rpm sensor 168, which detects the speed of output gear 10 independently of first rpm sensor 154. Backup controller 142 triggers second solenoid 58 via line 170. Via a CAN bus 172, main controller 140 and backup controller 142 exchange data with one another. For reasons of redundancy, backup controller 142 communicates the rpm ascertained by second rpm sensor 168 to main controller 140 via a line 174.

Main controller 140 issues signals for engaging the parking lock (no current flow) or disengaging it (current flow) to solenoids 56, 58. The command for this comes either from the operator, via operating lever 150, vehicle controller 148 and line 146, or it results from safety-relevant measured parameters that are processed in main controller 140. The command for engaging or disengaging the parking lock is routed by main controller 140 directly to first solenoid 56, and indirectly via line 174 and backup controller 142, which performs additional checks, to second solenoid 58.

If both solenoids 56, 58 are de-energized, then the valve positions shown in the drawing result, with which piston chamber 48 is connected to sump 70 via second solenoid 58, second check valve 82 and first solenoid 56. Piston 46 is also in its upper position due to the force of compression spring 50, and locking device 11 is pushed by main spring 42 into the illustrated engaged position. Drain valve 104 is opened by its spring and likewise allows a direct pressure equalization between piston chamber 48 and sump 70.

If, while first solenoid 56 is de-energized, only second solenoid 58 is supplied with power, then it changes over and connects its input 78 to its output 86. But since first solenoid 56 blocks the inflow from the pressure supply and since lines 74 and 80 are still connected to the sump and drain valve 104 remains open, this does not change the position of piston 46 at all.

If, while second solenoid 58 is de-energized, only first solenoid 56 is supplied with power, then it changes over and connects its first input 60 to its output 72. Now the system pressure is indeed present in connection line 80, but second check valve 82 prevents fluid inflow to piston chamber 48. The backflow from piston chamber 48 to sump 70 via 86, 84, 82, 80, 72 is blocked in this state but pressure is present at input 78 of second solenoid 58 which, via an internal leakage of solenoid 58, causes a slight leakage flow into piston chamber 48. This slight amount of leakage is diverted via the open drain valve 104 to sump 70, so that pressure that would cause an unexpected disengagement of the parking lock cannot build up in piston chamber 48. In this case as well, there is no change in the engaged state of the parking lock.

If both solenoids 56, 58 are supplied with power, however, and switch from the illustrated position into their excited positions, then the system pressure of pressure supply line 66 is fed to input check valve 62, first solenoid 56, and second solenoid 58 to piston chamber 48 and moves piston 46 downward against the force of compression spring 50 and main spring 42. In this case, locking device 11 moves from its engaged into its disengaged position. Due to the presence of a fluid flow, drain valve 104 closes. In this piston position, control pin 96 is pressed by collar 102 of piston 46 out of annular groove 100 and opens leakage compensation valve 94, so that the system pressure is also present at piston chamber 48 via connection line 90, in which pressure-maintaining check valve 88, throttle point 92 and leakage-compensation valve 94 are arranged.

If, with an excited second solenoid 58 (i.e., with power applied), only first solenoid 56 is cut off from power, then it changes over and connects its second input 68 to its output 72. Output 72 is indeed now connected to sump 70, but first check valve 76 prevents a backflow of fluid from piston chamber 48. The latter continues to be connected to pressure supply line 66 via connection line 90. The disengaged state of the parking lock does not change at all.

If, with an excited first solenoid 56, only second solenoid 58 is cut off from power, then it changes over and connects its second input 84 to its output 86. Under the effect of second check valve 82, a fluid flow from pressure supply line 66 to piston chamber 48 is no longer possible. Piston chamber 48 is still connected to pressure supply line 66 via connection line 90, however. The disengaged state of the parking lock does not change at all.

Independently of the position of solenoids 56, 58, an outflow of fluid from piston chamber 48 into pressure supply line 66 is prevented by input check valve 62, so that pressure built up in piston chamber 48 does not decrease because of an unintentional pressure drop in pressure supply line 62. Pressure-maintaining check valve 88 prevents fluid flow from piston chamber 48 through input 60 to input 68 via internal leakage of first solenoid 56, and thus to sump 70. Particularly in case of a loss of system pressure during travel, a residual leakage from piston chamber to sump 70 can appear, more specifically, via internal leakage of second solenoid 58 (from output 86 to input 84), check valve 82 and an internal leakage of first solenoid 56 (from output 72 to input 68). With an appropriate design of solenoids 56, 58, this leakage is so slight that, even at high oil temperature (low viscosity), sufficient pressure can be maintained in piston chamber 48 for roughly 10 min that an engagement of the parking lock does not occur.

If both solenoids 56, 58 are changed over from their excited state into their de-energized state, then piston chamber 48 is connected via second solenoid 58, second check valve 82 and first solenoid 56 to sump 70, so that an outflow of fluid from piston chamber 48 to sump 70 takes place. Throttle point 92 limits the fluid flow through connection line 90 so that it does not suffice to maintain the pressure in piston chamber 48. Piston 46 moves upward, control pin 96 slides into annular groove 100 and leakage-compensation valve 94 closes, so that the flow of fluid back via connection line 90 is interrupted. Drain valve 104 opens. At the same time, locking device 11 engages the parking lock.

Thus, a changeover of the parking lock function (pressurization or depressurization of the piston chamber) takes place only if both solenoids 56, 58 are switched in the same sense, that is, if controllers 140, 142 issue corresponding changeover signals to solenoids 56, 58.

If no malfunction is present, main controller 140 emits a current signal to excite first solenoid 56 and backup controller 142 emits a current signal to excite second solenoid 58. If shift lever 150 is brought into its park position and the speed of output gear 10 as detected by rpm sensors 154, 168 lies below a specifiable value, the flow of current to first solenoid 56 is interrupted by main controller 140. If the speed of output gear 10 as detected by rpm sensor 168 lies below a specifiable value, the flow of current to second solenoid 58 is interrupted by backup controller 142.

Because main controller 140 and backup controller 142 receive independent rpm signals of the vehicle drive system from the two rpm sensors 154 and 168, it is a redundant system to prevent a defective controller 140, 142 or a defective rpm sensor 154,168 from causing an unintended engagement of the parking lock above a specified travel speed.

By directly supplying power to backup controller 142 from the battery, it is guaranteed that turning the ignition off during travel does not lead to the engagement of the parking lock because second solenoid 58 then receives no signal to change over. Line 164 from the ignition key to backup controller 142 serves only as a wake-up signal for backup controller 142. The two controllers 140, 142 are connected via a communications bus 174 that permits mutual monitoring.

At all times, pressure sensor 106 supplies backup controller 142 with a report on the actual position of the parking lock. Above an upper pressure threshold (15 bar, for instance), the parking lock is considered disengaged (unlocked). It is reasonable for the lower pressure threshold to lie beneath a pressure that results from the spring force of compression spring 50 and the piston surface area of piston 46, so that pressure falls below this level only when piston 46 contacts the stopping point for the engaged position, even if the mechanical linkage of locking device 11 is blocked in the tooth-on-tooth position and has not (yet) engaged.

If the emergency actuation is used for towing, for instance, when the parking lock is not functioning and at the same time the diesel engine is to be operative (in order to provide, for instance, the supply pressure for servo-assisted steering and braking), main controller 140, constructed as a transmission controller, receives, via position switch 128 and rotary potentiometer 130 on the clutch pedal, the request to set the transmission to "neutral." Reliably and without additional sensors, this prevents the vehicle from being operated with a permanently manually disengaged parking lock. Position switch 128 and rotary potentiometer 130 can thus be used for controlling the transmission and for controlling the emergency operation.

Even though the invention has been described on the basis of one embodiment by way of example, various alternatives, modifications that fall under the present invention occur in light of the description and the drawing to the person skilled in the art. Thus, for instance, the controller according to the invention can also be applied to parking brakes, for which, in contrast to parking locks, not a positive lock, but a non-positive lock is created to immobilize the vehicle. In place of the above-described hydraulic actuating drive and the electro-hydraulic triggering means, for instance, components operating purely electrically which fulfill the control functions described in the claims can be used to influence locking device 11.

What is claimed is:

1. A control device for the parking lock of a motor vehicle with at least one actuating drive (46) which can be operated by triggering means and by which at least one locking device (11) for the parking lock can be brought from a lock engaged position, into which it is pressed by a retaining force, into a lock disengaged position, wherein at least two triggering means (56, 58) acting independently on an actuating drive (46) are provided, which interact with the actuating drive (46) such that a movement of locking device (11) out of the lock engaged to the lock disengaged position or, conversely, from the disengaged to the engaged position, takes place only if both triggering means (56, 58) are triggered with changeover signals in the same sense.

2. The control device according to claim 1 wherein the actuating drive is a hydraulic actuating piston (46) that brings the parking lock into its disengaged position when subjected to pressure.

3. The control device according to claim 2 wherein a piston chamber (48) of actuating piston (46) is connected via an additional valve arrangement (88, 92, 94) to a pressure source (64).

4. The control device according to claim 3 wherein the valve arrangement contains a throttle point (92).

5. The control device according to claim 3 wherein a controllable leakage-compensation valve (94) is arranged in a connection line (90) connecting piston chamber (48) to pressure source (64) through which the hydraulic flow from a pressure source (64) to the piston chamber (48) can be controlled.

6. The control device according to claim 5 wherein the leakage-compensation valve (94) is a check valve pressed by a restoring spring into the closed position.

7. The control device according to claim 5 wherein the leakage-compensation valve (94) is connected via a mechanical linkage element (96) to a hydraulic actuating piston (46) such that it is opened when actuating piston (46) occupies a position corresponding to the lock disengaged position.

8. The control device according to one of claim 2 further comprising a drain valve (104) that is opened by spring force in the absence of pressure connecting a piston chamber (48) of actuating piston (46) to a sump (70).

9. The control device according to claim 1 wherein the triggering means contains electrically triggerable hydraulic valves (56, 58).

10. The control device according to claim 9 wherein a first hydraulic valve (56) of the triggerable hydraulic valves (56, 58) has a first input (60) connected to a pressure source (64), a second input (68) connected to a sump (70) and an output (72), the output (72) being connected to the second input (68) in the de-energized state and to the first input (60) in the presence of a voltage wherein the output (72) of first hydraulic valve (56) is connected by a first connection line (74) to a first input (78) of a second hydraulic valve (58) of the triggerable hydraulic valves (56, 58) and via a second connection line (80) to a second input (84) of second hydraulic valve (58) wherein an output (86) of second hydraulic valve (58) is connected in the de-energized state to second connection line (80) and in the presence of a voltage to the first connection line (74); and wherein the output (86) of second hydraulic valve (58) is connected to actuating drive (46).

11. The control device according to claim 10 further comprising a check valve (76) in first connection line (74) that prevents a backflow from second hydraulic valve (58) to first hydraulic valve (56).

12. The control device according to claim 10 further comprising a check valve (82) in second connection line (80) that prevents an inflow from first hydraulic valve (56) to second hydraulic valve (58).

13. The control device according to claim 10 further comprising a pressure-maintaining check valve (88) arranged in a connecting line (90) linking piston chamber (48) to first input (60) of the first hydraulic valve (56) which prevents a backflow from piston chamber (48) to the first hydraulic valve (56).

14. The control device according to claim 9 further comprising an input check valve (62) located in a pressure supply line (66) supplying hydraulic valves (56, 58) that is closed in case of loss of system pressure.

15. The control device according to claim 1 wherein the locking device (11) has a detent pawl (12) seated in the transmission case and adapted to be brought into engagement with a gear (10) firmly connected to the vehicle axle and which is connected via mechanical linking elements (24, 38, 44) to actuating drive (46).

16. The control device according to claim 1 further comprising a mechanical emergency actuation device (108) wherein locking device (11) can be brought from its engaged position into its disengaged position, and further comprising bias means for urging locking device (11) to its disengaged position.

17. The control device according to claim 16 further comprising a lost motion mechanism (110) between the locking device (11) and the emergency actuation device (108) to permit normal movements of the park locking mechanism without causing any motion of the emergency actuation device.

18. The control device according to claims 16 further comprising at least one electrical controller (140, 142) providing control signals to hydraulic valves (56, 58) for engaging or disengaging the parking lock and at least one sensor (130, 128) to detect the position of the clutch pedal (114) whose signals are acquired and analyzed by controller (140).

19. The control device according to claim 1 wherein locking device (11) is adapted to be detachably coupled, for an emergency actuation, to a clutch pedal (114) wherein locking device (11) assumes its disengaged position upon actuation of the clutch pedal (114).

20. The control device according to claim 1 further comprising at least one electrical controller (140, 142) providing control signals to hydraulic valves (56, 58) for engaging or disengaging the parking lock.

21. The control device according to claim 20 further comprising an operating lever (150) and at least one transducer connected to the controller (140) that detects the position of the operating lever.

22. The control device according to claim 21 wherein the controller (140, 142) acquires and processes signals from at least one additional measurement transducer.

23. The control device according to claim 20 further comprising a transducer (106) connected to the controller (142) that detects the position of locking device (11).

24. The control device according to claim 1 further comprising a main controller (140) and a backup controller (142) which are supplied power independently of one another and which communicate with one another wherein the main controller (140) triggers a first hydraulic valve (56) directly and triggers a second hydraulic valve (58) via backup controller (142).

25. The control device according to claim 24 wherein the main controller (140) and backup controller (142) each receive an output signal of an independent speed sensor (154, 168) from the vehicle drive unit.

* * * * *